United States Patent
Yap et al.

(10) Patent No.: US 8,800,748 B2
(45) Date of Patent: Aug. 12, 2014

(54) METHOD AND APPARATUS FOR EDGE JUSTIFICATION OF MAIL ITEMS

(75) Inventors: Anthony E. Yap, Danbury, CT (US); Arthur H. DePoi, Brookfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 335 days.

(21) Appl. No.: 13/226,720

(22) Filed: Sep. 7, 2011

(65) Prior Publication Data

US 2012/0063875 A1 Mar. 15, 2012

Related U.S. Application Data

(60) Provisional application No. 61/381,470, filed on Sep. 10, 2010.

(51) Int. Cl.
*B65G 47/22* (2006.01)
*B65G 47/24* (2006.01)

(52) U.S. Cl.
CPC ........ *B65G 47/24* (2013.01); *B65G 2201/0285* (2013.01)
USPC ...................... 198/410; 198/370.09; 271/252

(58) Field of Classification Search
USPC ............ 198/369.4, 370.09, 436, 457.02, 624, 198/410; 271/226, 227, 228, 248, 249, 250, 271/251, 252, 254
See application file for complete search history.

(56) References Cited

U.S. PATENT DOCUMENTS

| | | | | |
|---|---|---|---|---|
| 3,148,877 A | * | 9/1964 | Brearley | 271/251 |
| 3,910,402 A | * | 10/1975 | Dean | 198/369.4 |
| 4,621,801 A | * | 11/1986 | Sanchez | 271/251 |
| 4,703,844 A | * | 11/1987 | Jahns | 198/367 |
| 4,836,527 A | * | 6/1989 | Wong | 271/251 |
| 4,919,318 A | * | 4/1990 | Wong | 226/17 |
| 5,219,159 A | * | 6/1993 | Malachowski et al. | 271/228 |
| 5,460,362 A | * | 10/1995 | Fassman et al. | 271/264 |
| 5,697,609 A | * | 12/1997 | Williams et al. | 271/228 |
| 6,019,365 A | * | 2/2000 | Matsumura | 271/227 |
| 6,137,989 A | * | 10/2000 | Quesnel | 399/394 |
| 6,273,418 B1 | * | 8/2001 | Fujikura et al. | 271/228 |
| 6,581,929 B2 | * | 6/2003 | Hiramitsu | 271/228 |
| 6,942,214 B2 | * | 9/2005 | Riccardi | 271/227 |
| 7,845,635 B2 | * | 12/2010 | Herrmann | 271/228 |

FOREIGN PATENT DOCUMENTS

| | | |
|---|---|---|
| DE | 1113423 B | 8/1961 |
| DE | 10115906 A1 | 10/2003 |
| EP | 1312427 A1 | 5/2003 |

* cited by examiner

*Primary Examiner* — William R Harp
(74) *Attorney, Agent, or Firm* — Michael J. Cummings; Charles R. Malandra, Jr.; Steven J. Shapiro

(57) ABSTRACT

An edge justification device for a mail processing machine. The device shifts the mailpiece from bottom edge justified to top edge justified. The amount of shift is determined as a function of the height of the mail piece. One embodiment solves the problem of switching from bottom to top registration by having a series of steerable nips, which are arranged in line, parallel to the mail flow direction. As the mail piece travels though the justifier, the nips will rotate to impart a lateral velocity to the mail piece, shifting it over to properly justify it. In a further embodiment, the nips of the justification device are not steerable. Rather, a whole nip assembly that is transporting the mail piece is moved laterally to switch from bottom to top justification.

17 Claims, 10 Drawing Sheets

METHOD AND APPARATUS FOR EDGE JUSTIFICATION OF MAIL ITEMS

RELATED APPLICATION

This application is based on Provisional Application 61/381,470, filed Sep. 10, 2010, and takes the benefit thereof under 35 U.S.C. §119(e). That Provisional Application is expressly incorporated by reference into this application.

TECHNICAL FIELD

The present invention relates to switching edge justification of a mail item in a mail sorting machine.

BACKGROUND OF THE INVENTION

In a conventional mail sorter machine, mail, which can be of various heights and sizes, are all loaded into the sorter bottom edge justified to support bar code scanning, bar code printing, address reading, and a number of other functions. The current Pitney Bowes high speed postage meter, the DM Infinity, requires that mail be top edge justified so that the indicia or permit can be printed a fixed distance from the top edge of the envelope.

Some prior art justification and registration mechanisms involve a series of angled rollers that drive the mailpiece against a fixed wall. Above the angled rollers are a series of balls, which provide a normal force to the mailpiece to maintain drive between the drive rollers and the mailpiece. This works relatively well when all the envelopes are all approximately the same size (as in an inserter machine, used for production mail). The wall can be adjusted so that the amount of lateral shift required is minimal.

Unlike an inserter machine that is producing mail to be placed in same sized envelopes, sorters must be capable of handling a wide variety of different sized envelopes. Thus, for the sorter scenario, the media size will range from a 5" long× 3.5" tall postcard to 11.5" long×7.25" tall envelope at ⅜" thick. The difference in height between the shortest and tallest piece will be 3.75". To accomplish the full justification shift with the conventional inserter registration device, it would require a 3.5" tall postcard to travel more than its height before coming in contact with a wall. The long distance that it has to travel provides significant opportunities for the mailpiece to skew.

Another deficiency with the prior art design, for use in a mail sorter machine, is that the balls must have enough force to shift over the heaviest piece, while being light enough to allow the angled rollers to slips when the mailpiece hits a wall on the lightest piece. Due to the large difference between the smallest and largest mailpiece, getting the proper force will be difficult, if not impossible for the total range of mailpiece sizes.

Exemplary prior art registration devices are described in U.S. Pat. Nos. 4,775,143, 6,102,391, 6,715,755, 7,416,183, 7,516,904, and 7,614,551, which are hereby incorporated by reference.

SUMMARY OF THE INVENTION

The present invention facilitates the combination of in-line metering functionality with a high end mail sorter, for sorting variable sized envelopes and mail items. The invention described herein will be installed before the meter, to shift the mailpiece from bottom edge justified to top edge justified so that the meter can place the postage in the proper position on the envelope. The amount of shift is determined as a function of the height of the mail piece. An identical module can be installed after the meter to shift the mailpiece back to bottom edge justified so that it can be processed with the mechanisms that currently exist within the mail sorter. In view of the wide range of sizes of mail to be sorted, the problems identified above become an issue.

A preferred embodiment of the invention (referred to as the 'justifier') solves the problem of switching from bottom to top registration by having a series of steerable nips, which are arranged in line, parallel to the mail flow direction. As the mail piece travels though the justifier, the nips will rotate to impart a lateral velocity to the mail piece, shifting it over to properly justify it. The steerable nips are servo controlled so that they can vary the amount of lateral shift on a per piece basis, as required by high speed sorters, in which the pieces are expected to have a variety of different lateral heights. It is desirable to perform this justification function in the shortest length possible. Also, it is a requirement to perform this function at 100 ips (inches per second) and at 26,000 mail pieces per hour cycling speed, to match the speeds of high speed postage meters, such as the DM Infinity meter of Pitney Bowes Inc.

In a further embodiment, the nips of the justification device are not steerable. Rather, a whole nip assembly that is transporting the mail piece is moved laterally to switch from bottom to top justification. The amount of lateral movement of the nip assembly is a function of the height of the mail piece.

Further details of the present invention are provided in the accompanying drawings, detailed description, and claims.

DETAILED DESCRIPTION

Figure 1:
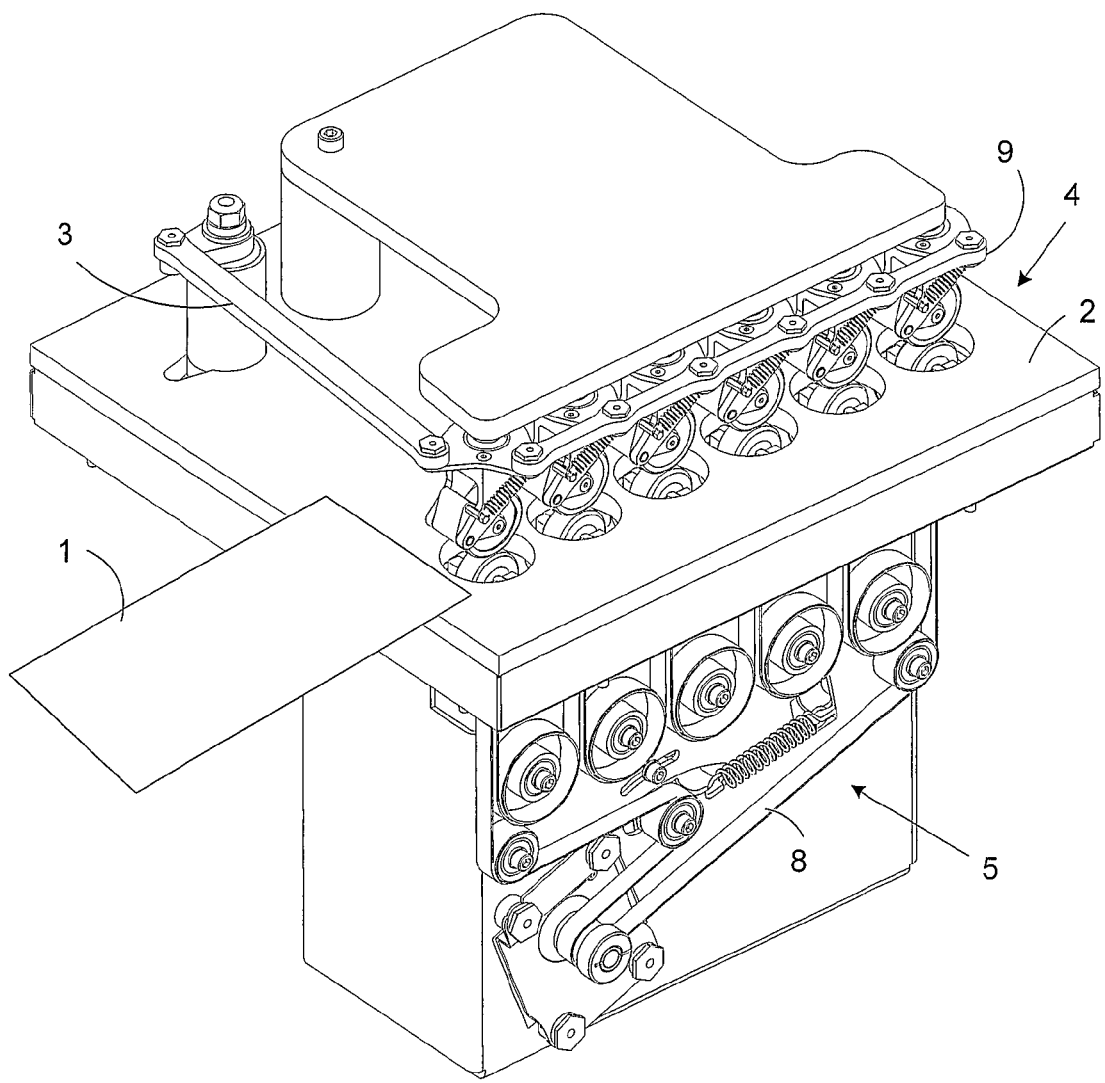
FIGS. 1-4 depict the justifier having steerable nips.
Figure 2:
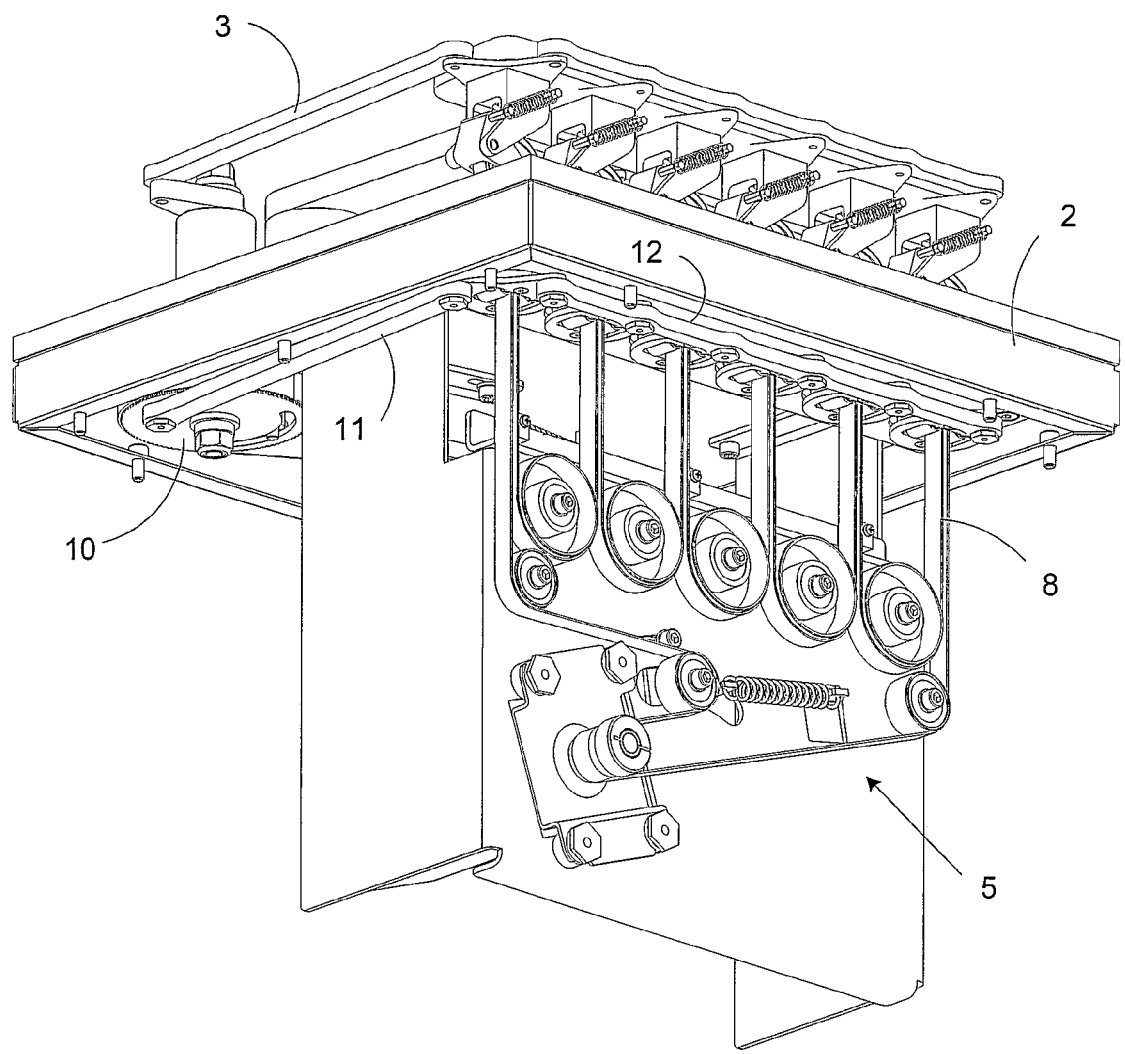
Figure 3:
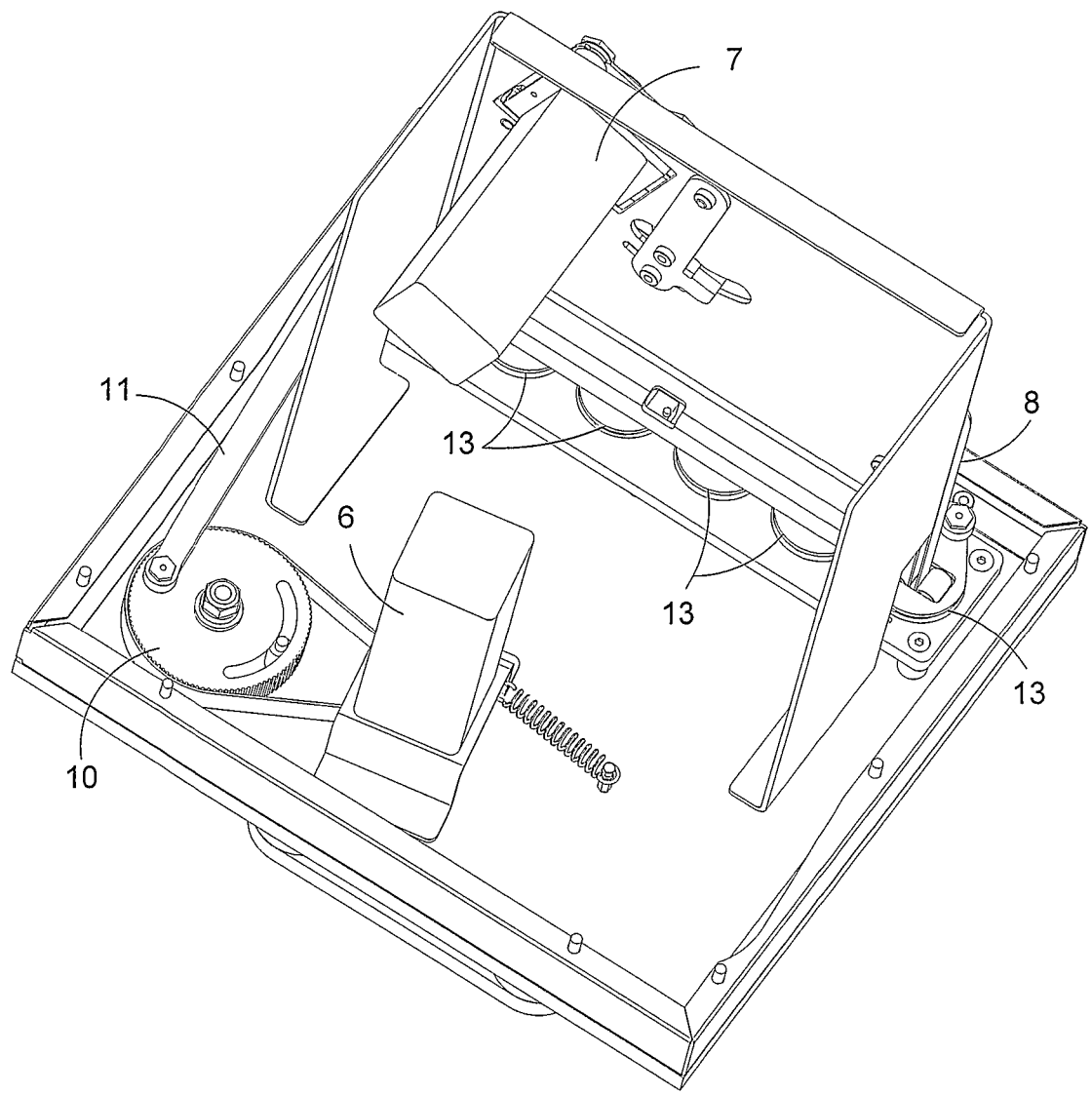
Figure 4:
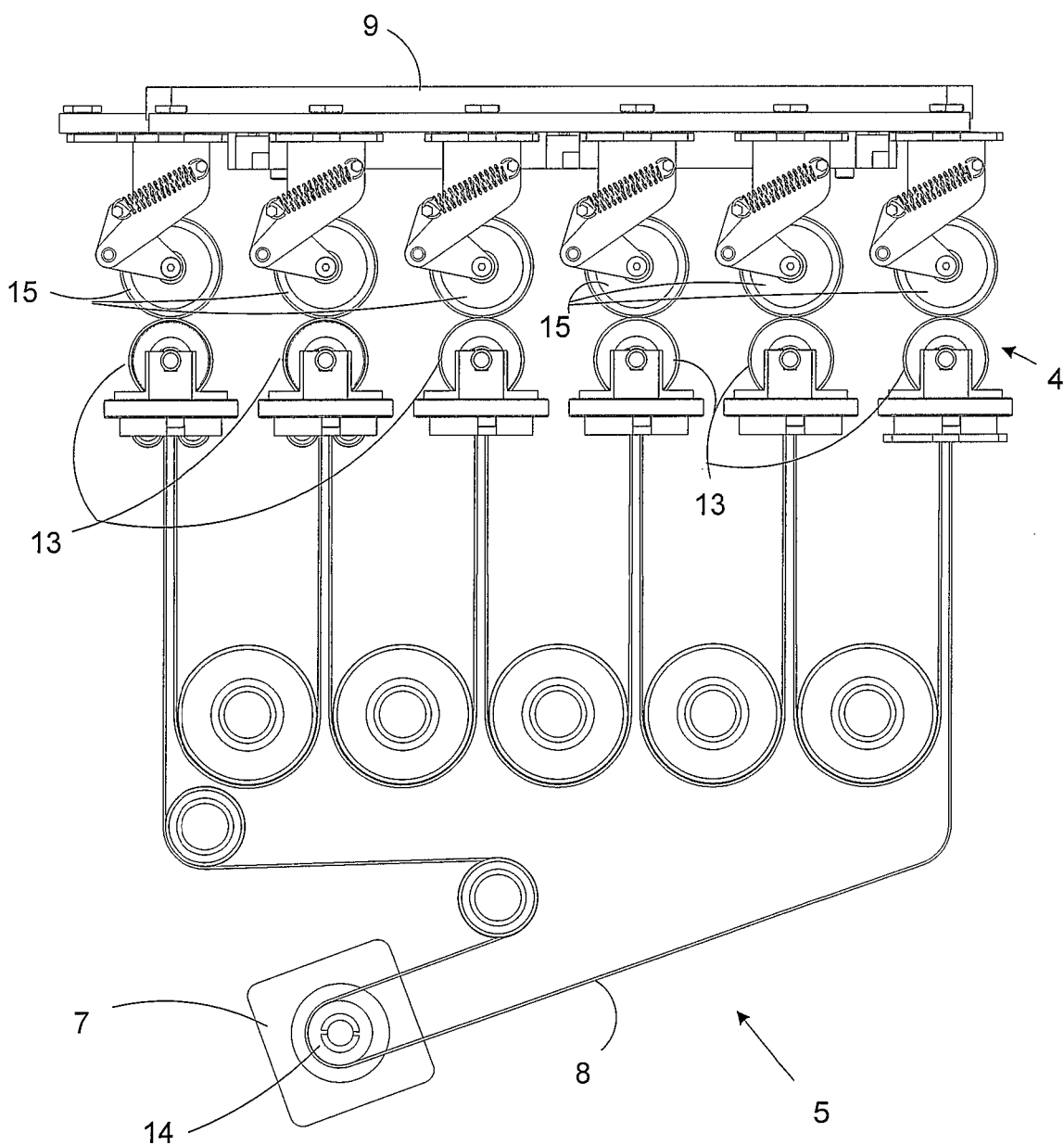

The preferred embodiment of the justifier 4 solves the problem by having a series of steerable nips (13, 15), that are arranged in line, parallel to the mail flow direction. (See FIGS. 1-4). Each nip is composed up an upper steerable idler 15, and a lower steerable drive nip 13. Power to the lower steerable drive nips 13 is provided by a single flat belt 8. This single belt 8 is routed through each of the steerable nips 13 and is driven by a servomotor 7, having a driven pulley 14. The belt path 5 is arranged so that as the steerable nips 13 rotate, the flat belt 8 will twist slightly, with minimal change in path length. This allows the use of a non-elastic belt for drive efficiency and accuracy.

The nips, both the upper idlers 15 and the lower drive 13, are mechanically linked together with connecting rods (9, 12), so that the angle of each of the steerable nips (13, 15) will be equal to each other. Through another connecting link (3, 11), a second servo motor 6 provides the ability to rotate the nips, via a rotating cam 10.

Envelope 1 is delivered to the justifier 4 by a series of flat belts (not shown), common in the mail sorter. Justifier 4 includes a deck 2, to support the envelope 1. As the mail piece 1 approaches nip pairs 13, 15 are rotated so that they are parallel to the incoming mail piece 1. Once the piece 1 is fully under the control of the justifier 4, the nip pairs 13, 15 will rotate to impart a lateral velocity (referred to as Vy) to the mail piece 1. The lateral velocity profile will be computed to achieve a predetermined lateral displacement. The magnitude of this displacement will be determined from the height of the incoming envelope 1. Once the mail piece reaches the desired lateral position, the nip pairs 13, 15 are rotated back to parallel. This will allow the mail piece to exit cleanly into the meter, and readies the justifier 4 to accept the next mail piece.

To maintain the pitch of the envelopes as the mail piece 1 travels through the justifier, it is desired to maintain a constant forward velocity (referred to as Vx) through the justifier. However, if the speed of the drive nips 13 is held constant as they are steered, the forward velocity will drop off as the angle of the nips 13, 15 deviates from zero. Thus, the speed of the drive nips 13 must change according to the following formula:

$$V\text{drive\_nip} = (Vx^2 + Vy^2)^{0.5}$$

The angle of the steerable nips 13, 15 will be according to the following formula:

$$\text{ANGLEnips} = \arctan(Vy/Vx)$$

Thus, the angle and speed of the steerable nips 13, 15 are calculated based on the desired horizontal and vertical velocities.

To handle the full high spectrum from 3.5" tall to 10" tall, it is desirable to have the shortest mail piece shift upwards, and the tallest mail piece shift downwards (for a bottom to top re-justification). This reduces the maximum lateral shift magnitude, reducing the maximum lateral accelerations and velocities. Ideally, the system would be set up so that the average size piece goes straight through without any shift (This would be for a 6.75" piece in this scenario). Consequently, the 3.5" tall piece would shift 3.25" upwards, while the tallest piece shifts 3.25" downward. However, since this same justifier 4 would be used directly after the meter, and it is desirable not to have nips run over the freshly printed indicia (which would smear the image), the maximum vertical shift for the 3.5" piece is limited to 2". This provides a 1.5" 'clear zone' where the mail piece 1 is not touched so as to not smear the freshly printed indicia. This requires a downward shift of 4.5" for the tallest mail piece. This is all for a bottom to top registration shift. For a top to bottom registration shift (as it would be after the meter), the shift magnitudes would be the same, but the directions would be reversed.

In the preferred embodiment, the distance from the first to last nip is 300 mm. In a typical implantation, velocity parallel to the nips is 100 in/sec or 2.5 m/s. For a c5 envelope, the shift displacement will be roughly 2 inches. This displacement can be achieved in about 70 ms over the distance of the justifier 4. These speeds would allow processing of up to 26,000 mail pieces per hour.

Alternative Arrangement for Steerable Nip Justifier

In an alternate embodiment, instead of connecting links 3, 11 and steering arms 9, 12 to transfer motion between the steering motor 6 and the steerable nips 13, 15, a timing belt can be used. Instead of the steering arms 9, 12 mounted on the nip assemblies, a timing belt pulley is attached concentrically with the steering axis. A timing belt is used between the motor 6 and the steering assemblies to transfer the motion. This offers the benefit of increased range of travel.

To further increase travel, instead of the current serpentine belt 8 arrangement to power the drive roller 13, an arrangement of bevel and spur gears can be used to transfer motion from a rigidly mounted motor the drive roller mounted inside the steering assembly. This design gives the steerable assembly the ability to rotate a full 360 degrees, without any mechanical constraints.

Although the steerable nip assemblies described herein are being used in this case to impart a lateral shift of the incoming mail 1 to allow metering, this assembly could be used, with slight modifications, in other areas of a paper handling device to impart a variable lateral offset, or a direction change of the mail, such as a right angle turn.

Figure 5:
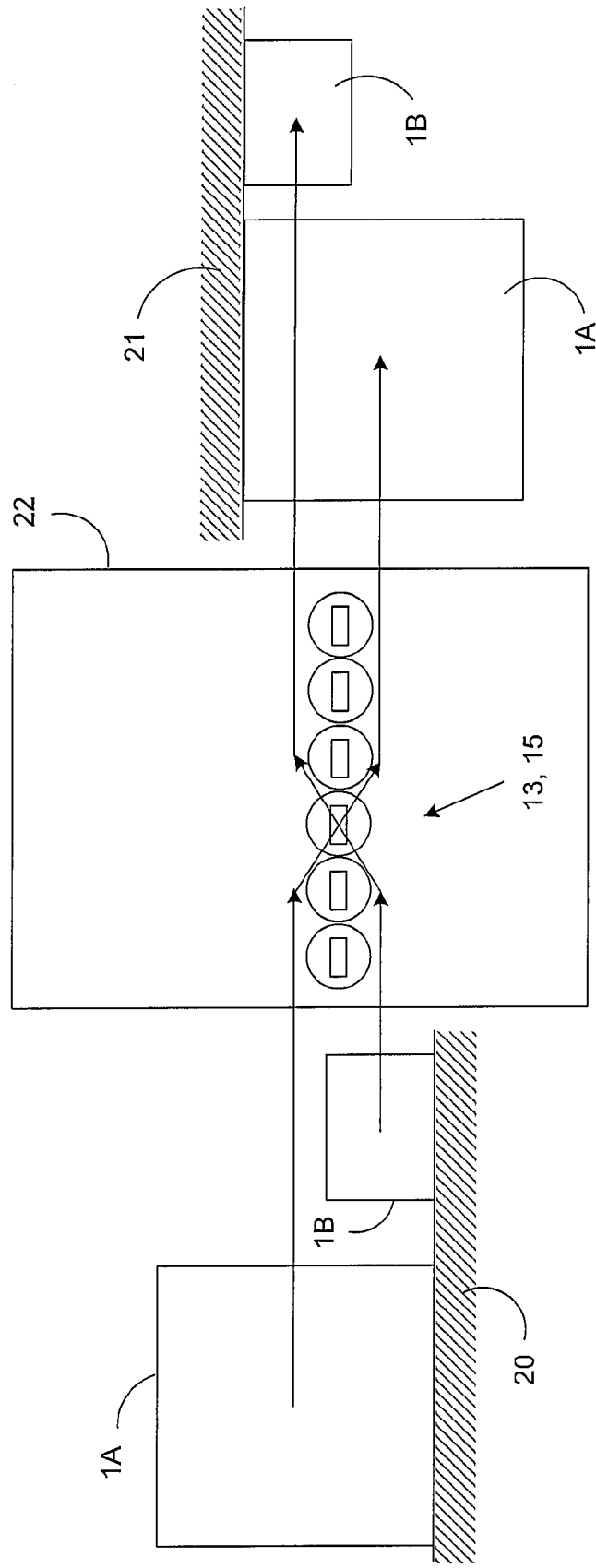
FIG. 5 depicts operation of the steerable justifier.
Figure 6:
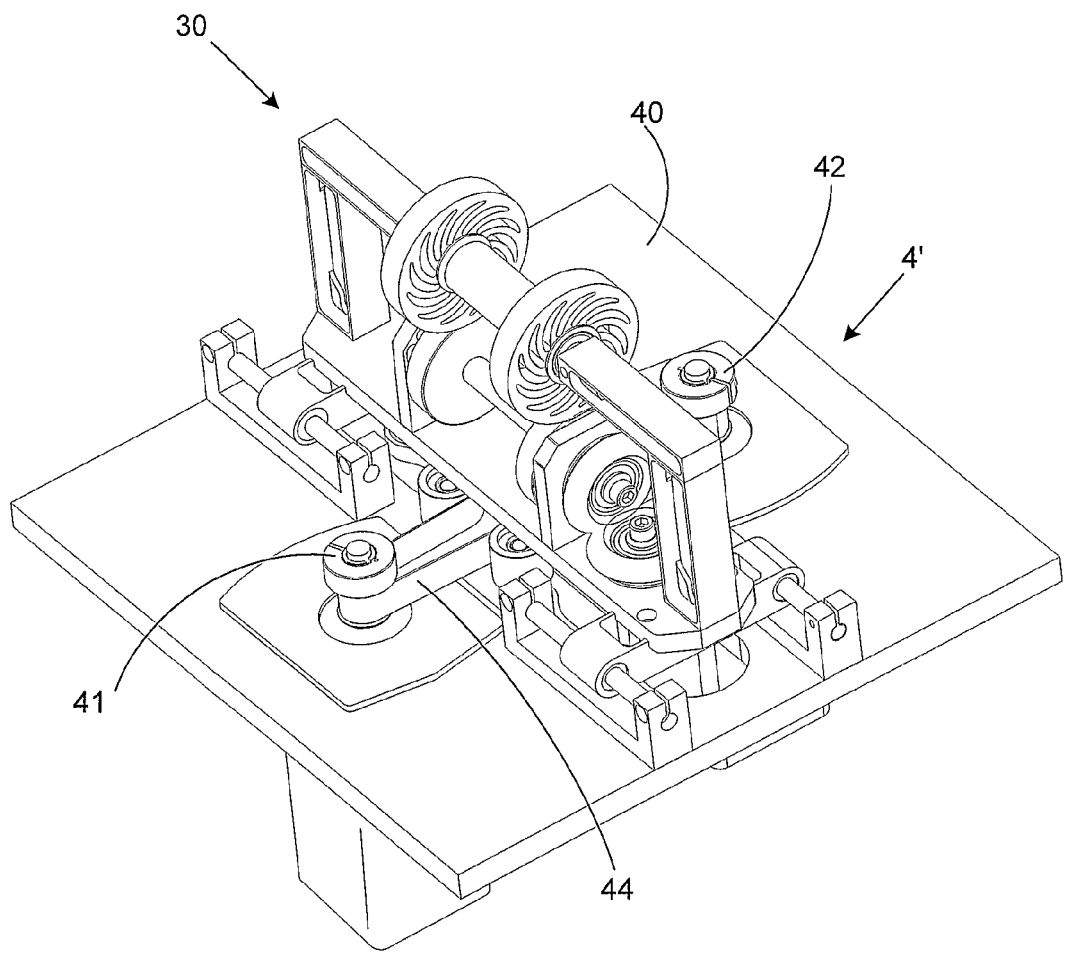
FIG. 6 depicts an alternative arrangement of the steerable justifier.
Figure 7:
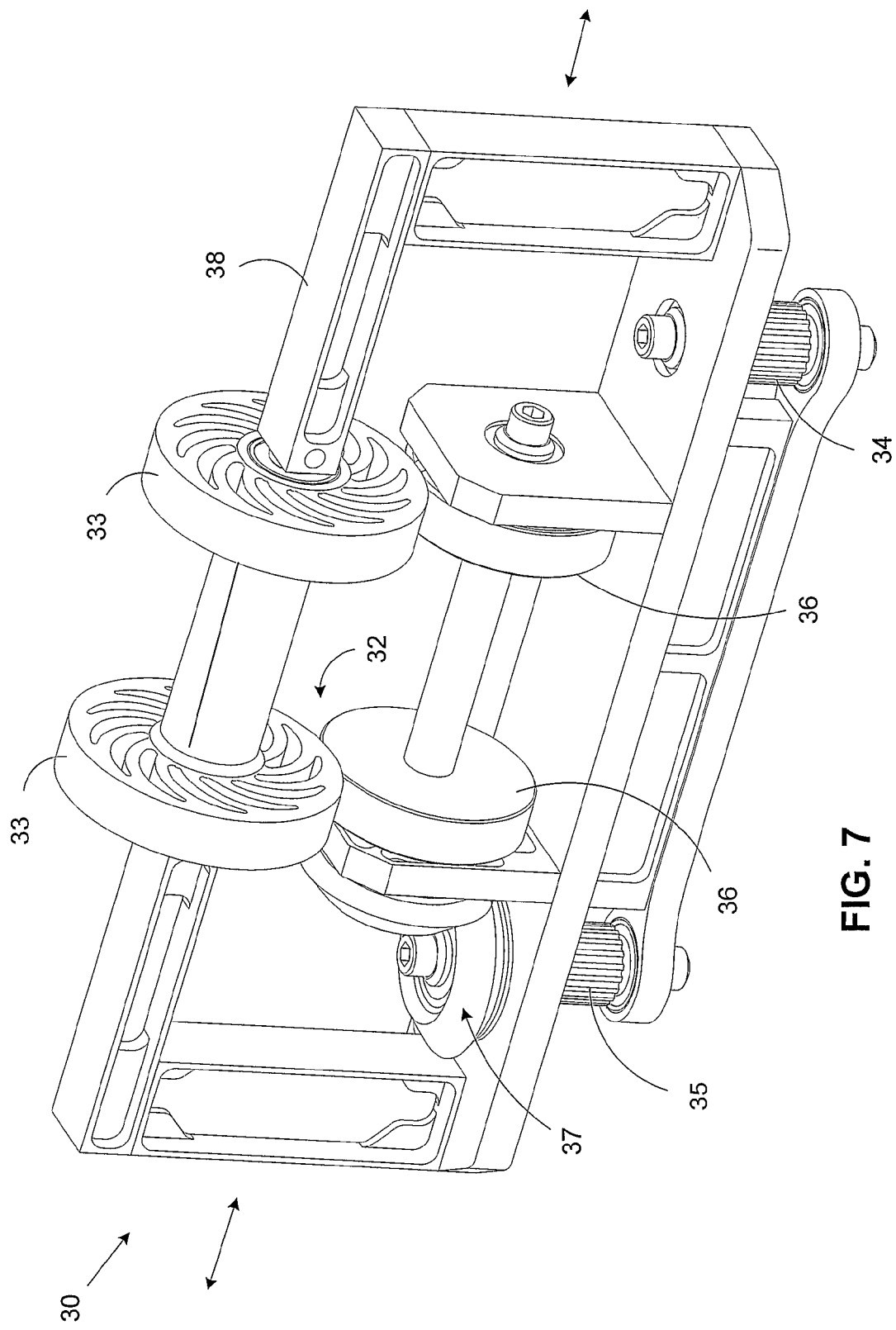
FIGS. 7, 8, 9A, 9B and 9C depict an alternative justifier comprising an assembly having a laterally sliding nip assembly.

FIG. 5 depicts the respective motion of different sized envelopes 1A and 1B as they travel through an exemplary justifier 22. As shown in FIG. 5, the envelopes travel from bottom justification 20 to top justification 21. For larger envelope 1A, it can be seen that the nips 13, 15 will be angled to steer the envelope downward, away from top justification wall 21. Conversely, smaller envelop 1B will be angled upward towards the justification wall.

Alternative Embodiment—Laterally Sliding Nip Assembly

Figure 8:
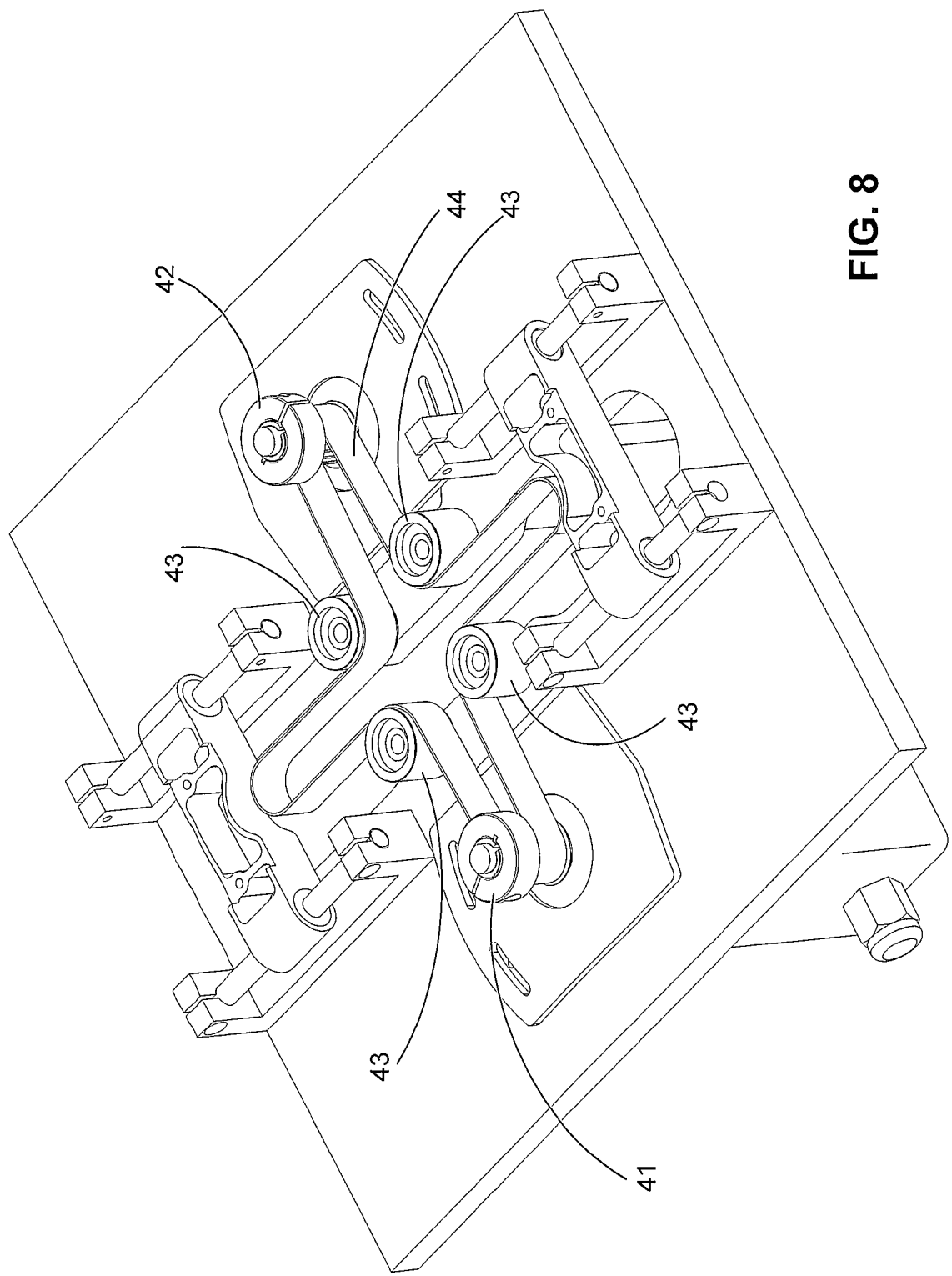

An alternative variation of the justifier 4' solves the problem by having a drive nip which is mounted on a linear slide nip assembly 30. (See FIGS. 6-9) As a mailpiece enters the nip pair 33, 36, the entire nip assembly 30 will slide a given displacement laterally to shift the mailpiece from bottom justified to top justified. The drive nip 36 and the sliding motion are created by a novel belt and motor arrangement, as seen in FIG. 8 and further described below The nip is comprised of a pair of rigid lower drive rollers 36 and a pair of compliant upper idler rollers 33. Each set of rollers is rigidly coupled together, to increases the paper's resistance to skew as the assembly slides laterally. The lower drive rollers 36 have a high friction coating on the driving surface, to increase the grip on the paper.

Mounted on the sliding assembly are a set of bevel gears 37, which transmit power from a drive timing pulley 44 to the drive rollers 36. Also, mounted on the sliding assembly 30 is an idler timing pulley 34, which moves with the sliding assembly 30.

Mounted to the fixed baseplate 40, are two servomotors 41, 42, and four belt idlers 43. A single timing belt 44 wraps around the two servomotor pulleys 41, 42 the four fixed belt idlers 43, and the two timing pulleys 34, 35 on the underside of the sliding assembly 30.

The belt 44 is arranged as such so that the belt length stays constant as the slider is moved through its travel. Referring to FIG. 9C, as the slider mechanism 30, along with the timing drive pulley 35 and timing idler pulley 34 is moved upwards, the belt spans 'A' and 'B' increase in length, while spans 'C' and 'D' shorten. By having these spans parallel to the slider 30 direction, the belt 44 length stays constant. Travel in the opposite direction is depicted in FIG. 9B.

With the following arrangement, the system has two degrees of freedom, one in the slider movement, and one in the nip rotation. The two servo motors 41, 42 work in conjunction for both of these movements.

Figure 9A:
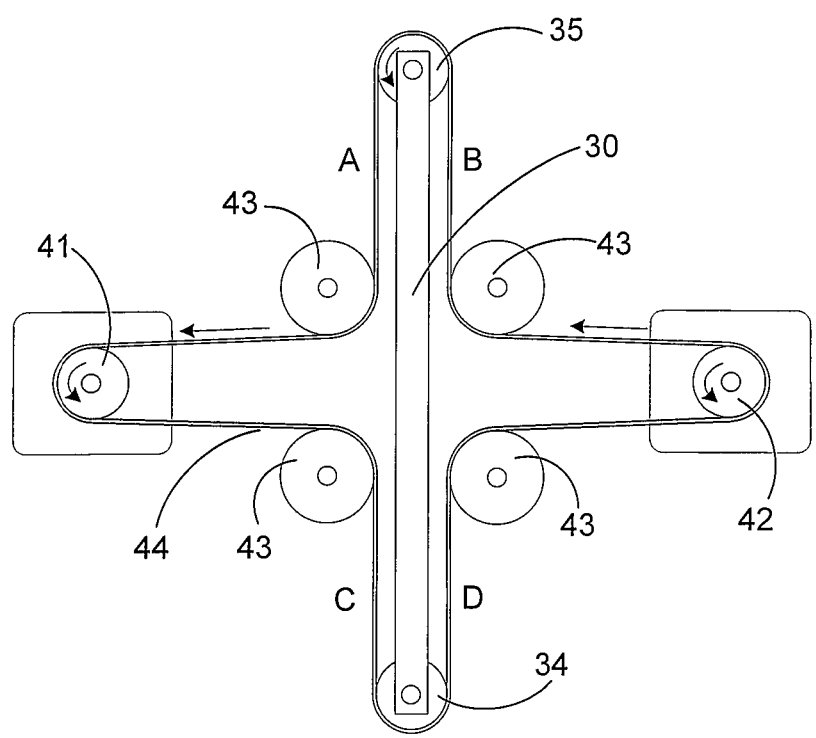
Figure 9B:
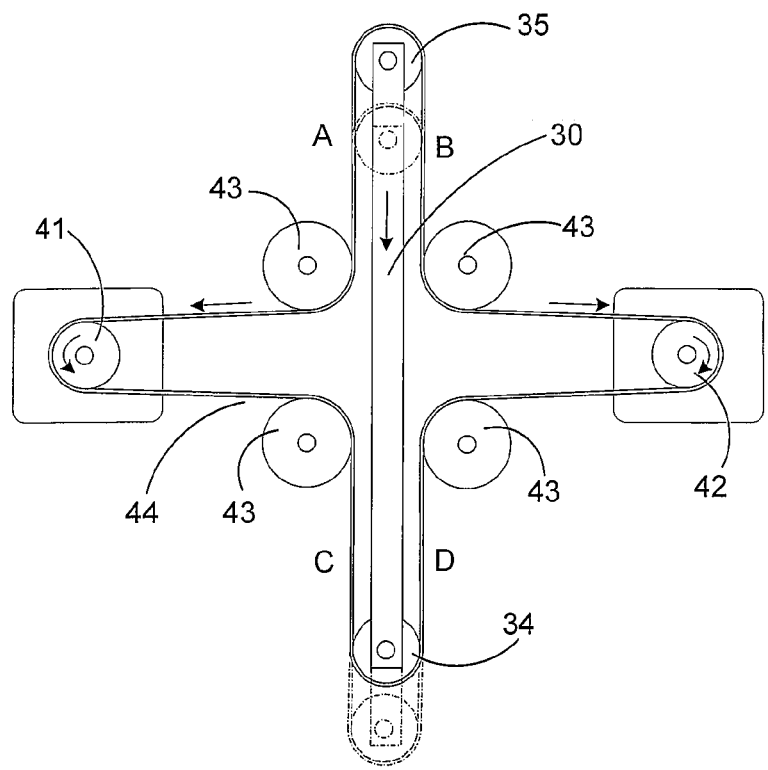
Figure 9C:
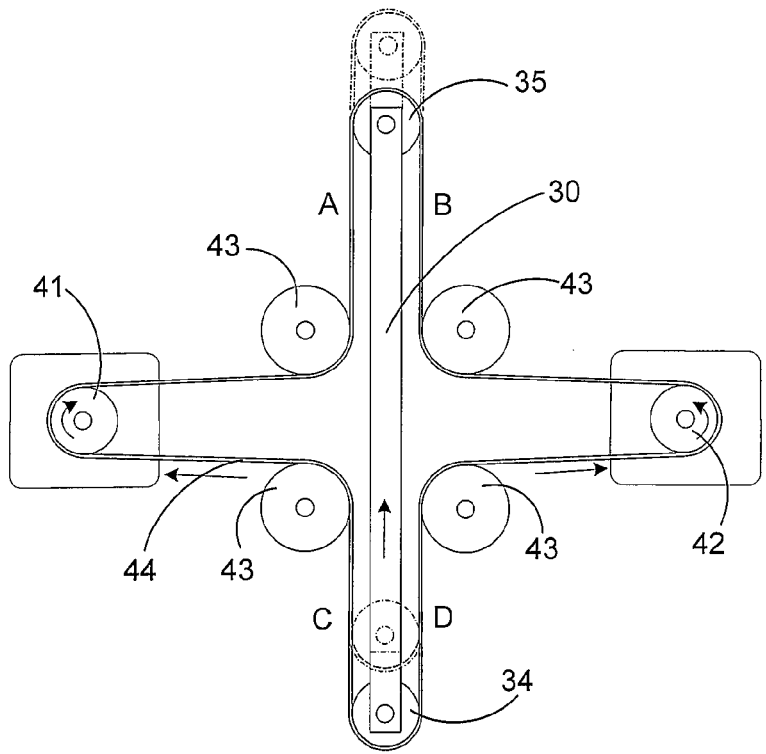

Nip rotation is accomplished by running both motors 41 and 42 in the same direction and at the same speed, as shown in FIG. 9A. This keeps the lengths of spans A, B, C, and D constant, which keeps the slider 30 stationary, while rotating the timing drive pulley 35. This, in turn, powers the bevel gears 37, which rotates the nips 32, 33. Thus the velocity of the nip is directly proportional to the sum of the velocities of the motors.

Slider 30 motion is accomplished by running both motors 41, 42 in equal and opposite directions. This keeps the timing drive pulley 35 stationary, but causes spans A, B, C, and D to change in length. The magnitude of the velocity of the slider 30 is directly proportional to the difference between the two motors.

It is desired during normal operation to have the nip pair 32, 33 spin at a constant 100 inches/sec, to keep the pitch of the incoming mailstream constant as it travels through the device. Once the mail is under control of the sliding nip 32, 33, the slider 30 will translate to induce a lateral shift in the mail. The magnitude of the sliding move will be based on the height of the incoming mailpiece.

To accomplish this, both motors 41, 42 will first accelerate to a constant angular velocity in the same direction to produce the nip rotation. Once the piece is ingested into the nip, one motor axis will execute a positive position move superimposed on its existing motion profile, while the other motor will execute a position move in the negative direction, also superimposed on the existing motion profile. This will produce a fixed linear offset of the slider while the nip rotation stays at a constant velocity.

To handle the full high spectrum from 3.5" tall to 7.25" tall, it is desirable to have the shortest mailpiece shift upwards, and the tallest mailpiece shift downwards (for a bottom to top re-justification). This reduces the maximum lateral shift magnitude, reducing the maximum lateral accelerations and velocities. Ideally, the system would be set up so that the average size piece goes straight through without any shift (This would be for a 5.125" piece in this scenario). Consequently, the 3.5" tall piece would shift 1.875" upwards, while the tallest piece shifts down 1.875. This is all for a bottom to top registration shift. For a top to bottom registration shift (as it would be after the meter), the shift magnitudes would be the same, but the directions would be reversed.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. A justifier apparatus for switching a transported item from bottom justification to top justification, or from top justification to bottom justification, the apparatus comprising:
    a first transport configured for transporting variable sized items justified along a first side;
    a justifier module downstream of the first transport, the justifier module configured to transport an item in a downstream direction and to move the item from justification along the first side to justification along a second side, opposite from the first side;
    a controller configured for controlling the justifier module to laterally displace the item, from justification on the first side to justification on the second side, as a function of a lateral height of the item;
    a second transport downstream of the justifier module for transporting variable sized items justified along the second side;
    a second justifier module downstream of the second transport configured to transport the item in the downstream direction and to move the item from justification along the second side to justification along the first side; and
    wherein the controller is configured to control the second justifier module to laterally displace the item for justification on the first side as a function of the lateral height of the item; and
    wherein the second transport is comprised of a postage printing device.

2. The justifier apparatus of claim 1 wherein the controller is configured to control the second justifier module to avoid subjecting a printed postage mark on the item to smearing by any mechanical transport elements of the second justifier module.

3. The justifier apparatus of claim 1 further comprising a sensor for detecting the lateral height of items, the sensor coupled to the controller and providing item height information to the controller.

4. The justifier apparatus of claim 1 wherein the justifier module comprises one or more sets of steerable nips, controllable by the controller, and wherein the controller is configured to steer the steerable nips at an angle to achieve lateral displacement of the item for switching edge justification within the justifier module.

5. The justifier apparatus of claim 1 wherein the justifier module is comprised of a non-steerable nip assembly configured to transport items in the downstream direction, wherein the non-steerable nip assemble is configured to slide laterally and the controller is configured to laterally displace the item by laterally moving the non-steerable nip assembly.

6. A justifier apparatus for switching a transported item from bottom justification to top justification, or from top justification to bottom justification, the apparatus comprising:
    a first transport configured for transporting variable sized items justified along a first side;
    a justifier module downstream of the first transport, the justifier module configured to transport an item in a downstream direction and to move the item from justification along the first side to justification along a second side, opposite from the first side;
    a controller configured for controlling the justifier module to laterally displace the item, from justification on the first side to justification on the second side, as a function of a lateral height of the item;
    a second transport downstream of the justifier module for transporting variable sized items justified along the second side;
    wherein the justifier module comprises one or more sets of steerable nips, controllable by the controller, and wherein the controller is configured to steer the steerable nips at an angle to achieve lateral displacement of the item for switching edge justification within the justifier module; and
    wherein a speed of the steerable nips is controllable by the controller so as to maintain a constant velocity in the downstream direction while adding a lateral velocity component for the lateral displacement.

7. The justifier apparatus of claim 6 wherein the steerable nips are controllable by the controller to be parallel to the downstream direction when the item initially enters the justifier module, to be turned at the angle after the item is within control of the steerable nips, and to be returned to parallel with the downstream direction prior to transferring the item to the second transport.

8. The justifier apparatus of claim 6 configured to handle a range of items having lateral heights from small (requiring the item to moved laterally toward the second side to be justified) to large (requiring the item to be moved laterally away from the second side to be justified), and wherein the steerable nips are configured to be steerable towards and away from the second side, and the controller is configured to control the steerable nips such that small items are steered in a direction towards the second side to achieve justification with the second side, and large items are steered in a direction towards the first side to achieve justification with the second side.

9. The justifier apparatus of claim 8 wherein the steerable nips are laterally positioned relative to a transport path of the first transport to receive all items having lateral heights from small to large.

10. An edge justification method for switching a transported item from bottom justification to top justification, or from top justification to bottom justification, the method comprising:
   transporting variable sized items justified along a first side of a first transport;
   receiving a transported item from the first transport in a justifier module downstream of the first transport,
   transporting the item in a downstream direction in the justifier module;
   laterally displacing the item in the justifier module from justification along the first side to justification along a second side, opposite from the first side, while transporting the item in the downstream direction,
   controlling lateral displacement, for justification on the first side to justification on the second side, as a function of a lateral height of the item;
   receiving the item in a second transport downstream of the justifier module for transporting variable sized items justified along the second side;
   receiving the item at a second justifier module downstream of the second transport and transporting the item in the downstream direction;
   performing a second lateral displacement on the item from justification along the second side back to justification along the first side, said second lateral displacement being as a function of the lateral height of the item.

11. The edge justification method of claim 10 further comprising a step of printing a postage indicia on the item while it is being transported in the second transport.

12. The edge justification method of claim 11 further comprising controlling the second lateral displacement to avoid subjecting a printed postage mark on the item to smearing by any mechanical transport elements.

13. The edge justification method of claim 10 wherein the justifier module is comprised of a non-steerable nip assembly configured to transport items in the downstream direction, wherein the non-steerable nip assemble is configured to slide laterally and further including a step of laterally displacing the item by laterally moving the non-steerable nip assembly while the item is within the non-steerable nip assembly.

14. An edge justification method for switching a transported item from bottom justification to top justification, or from top justification to bottom justification, the method comprising:
   transporting variable sized items justified along a first side of a first transport;
   receiving a transported item from the first transport in a justifier module downstream of the first transport,
   transporting the item in a downstream direction in the justifier module;
   laterally displacing the item in the justifier module from justification along the first side to justification along a second side, opposite from the first side, while transporting the item in the downstream direction,
   controlling lateral displacement, for justification on the first side to justification on the second side, as a function of a lateral height of the item; and
   receiving the item in a second transport downstream of the justifier module for transporting variable sized items justified along the second side;
   wherein the justifier module comprises one or more sets of steerable nips and further comprising the step of steering the steerable nips at an angle to achieve lateral displacement of the item for switching edge justification within the justifier module.

15. The edge justification method of claim 14 further comprising controlling a speed of the steerable nips so as to maintain a constant velocity in the downstream direction while adding a lateral velocity component for the lateral displacement.

16. The edge justification method of claim 15 further comprising controlling the steerable nips to be parallel to the downstream direction when the item initially enters the justifier module, to be turned at the angle after the item is within control of the steerable nips, and to be returned to parallel with the downstream direction prior to transferring the item to the second transport.

17. The edge justification method of claim 14 for handling a range of items having lateral heights from small (requiring the item to be moved laterally toward the second side to be justified) to large (requiring the item to be moved laterally away from the second side to be justified), and wherein the steerable nips are configured to be steerable towards and away from the second side, further including a step of controlling the steerable nips such that small items are steered in a direction towards the second side to achieve justification with the second side, and large items are steered in a direction towards the first side to achieve justification with the second side.

* * * * *